United States Patent
Lee

(10) Patent No.: US 10,531,080 B2
(45) Date of Patent: Jan. 7, 2020

(54) MEASUREMENT METHOD FOR MEASURING DISPLAY PANEL AND APPARATUS THEREOF

(71) Applicants: HKC Corporation Limited, Shuitian Village, Shiyan Sub-district, Bao'an District, Shenzhen, Guangdong (CN); Chongqing HKC Optoelectronics Technology Co., Ltd., Chongqing (CN)

(72) Inventor: Chia-Hang Lee, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/068,399

(22) PCT Filed: Dec. 20, 2017

(86) PCT No.: PCT/CN2017/117336
§ 371 (c)(1),
(2) Date: Jul. 6, 2018

(87) PCT Pub. No.: WO2019/041664
PCT Pub. Date: Mar. 7, 2019

(65) Prior Publication Data
US 2019/0158823 A1 May 23, 2019

(30) Foreign Application Priority Data
Aug. 28, 2017 (CN) .......................... 2017 1 0750925

(51) Int. Cl.
*H04N 17/00* (2006.01)
*H04N 17/02* (2006.01)
*G06T 7/90* (2017.01)

(52) U.S. Cl.
CPC ............... *H04N 17/02* (2013.01); *G06T 7/90* (2017.01); *G06T 2207/10024* (2013.01)

(58) Field of Classification Search
CPC . H04N 17/02; G06T 7/90; G06T 2207/10024; G02F 1/1309
(Continued)

(56) References Cited

U.S. PATENT DOCUMENTS

| 2009/0010538 A1* | 1/2009 | Kim ....................... H04N 5/202 382/167 |
| 2016/0104408 A1 | 4/2016 | Kim et al. |
| 2016/0321823 A1* | 11/2016 | Karasawa ............... G03B 17/18 |

FOREIGN PATENT DOCUMENTS

| CN | 105244007 A | 1/2016 |
| CN | 105390087 A | 3/2016 |

(Continued)

OTHER PUBLICATIONS

International Search Report and Written Opinion dated May 25, 2018, in International Application No. PCT/CN2017/117336.

*Primary Examiner* — Jefferey F Harold
*Assistant Examiner* — Jean W Desir
(74) *Attorney, Agent, or Firm* — Muncy, Geissler, Olds & Lowe, P.C.

(57) ABSTRACT

This application relates to a measurement method for measuring a display panel and an apparatus thereof. The measurement method for measuring a display panel includes: correcting a measurement picture of a display panel; obtaining, by using a measurement apparatus, a picture to be measured; setting a shooting instrument to complete a shooting parameter under a measurement environment;

(Continued)

shooting and correcting system measurement data by using the shooting parameter; replacing a display panel to be measured; measuring a gamma curve; and outputting a gamma curve, where the display panel needs to be corrected only once, and a gamma curve of a next display panel continues to be measured.

16 Claims, 8 Drawing Sheets

(58) Field of Classification Search
USPC ............... 348/191, 180, 687, 674; 345/690; 382/167
See application file for complete search history.

(56) References Cited

FOREIGN PATENT DOCUMENTS

| | | | |
|---|---|---|---|
| CN | 105513565 | A | 4/2016 |
| CN | 107045863 | A | 8/2017 |
| CN | 107479222 | A | 12/2017 |
| JP | 2008070734 | A | 3/2008 |

\* cited by examiner

MEASUREMENT METHOD FOR MEASURING DISPLAY PANEL AND APPARATUS THEREOF

BACKGROUND

Technical Field

This application relates to a detection method, and in particular, to a measurement method for measuring a display panel and an apparatus thereof.

Related Art

In a current color correction method for a display device such as a liquid crystal display (LCD), color correction is performed by adjusting gamma curves of three primary colors, red, green, and blue (R, G, B), of an LCD panel. Generally, there are mainly two conventional methods for performing color correction of an LCD panel by adjusting gamma curves of R, G, B, of the LCD panel. A first conventional color correction method is using human eyes to separately adjust, according to feelings and experience thereof, a gamma curves of R, G, B of a target LCD panel whose colors need to be corrected, to correct color characteristics of the target LCD panel. However, this method obviously requires a large amount of labor and time and would easily produce errors. In this way, a quality of a color correction result is very unstable.

A second color correction method is separately inputting gray-scale input signals of three primary colors, red, green, and blue, with a plurality of scales (for example, 256 scales) into a reference LCD panel used as a golden sample, so as to output a plurality of reference patterns in the reference LCD panel, then measuring the plurality of reference patterns by using a colorimeter to produce a plurality of groups of first chrominance coordinate values corresponding to CIE-xyY color space, and then separately changing gamma curves of R, G, B of the target LCD panel in a trial and error manner to try to generate a plurality of groups of second chrominance coordinate values close to or the same as the plurality of groups of first chrominance coordinate values.

However, because chrominance coordinate values of the CIE-xyY color space are linear dependent, when the gamma curves of R, G, B meeting color characteristics of the reference LCD panel are found in a conventional trial and error manner, a large amount of measurement data is needs, and three colors, red, green, blue, are separately measured (that is, 256*1024*3 pieces of data are needed). In other words, the conventional color correction method takes very long time to adjust the gamma curves of R, G, B of the target LCD panel, so that color characteristics of the target LCD panel are substantially equal to color characteristics of the reference LCD panel.

A gamma curve is a most important photoelectric curve in a television. Generally, a gamma curve of a television is designed as a gamma 2.2 curve so as to effectively compensate an existing display system and make human eyes obtain optimal display effects. However, management and control of a gamma curve by a display manufacturer is very difficult, and many process factors affect gamma curve characteristics of a display. To increase a qualification rate of products meeting a gamma curve, panel factories have stricter management and control on a process of an LCD panel. Therefore, a product yield rate may be affected, and competitiveness of the product is endangered. Therefore, a good and fast gamma curve verification method is very important for improvement of gamma curve characteristics of a display.

A gamma curve of a display needs to be progressively measured in a sequential manner. It takes approximately 256 seconds to measure a group of 8-bit gamma curves. If each flat product needs to be measured for 256 seconds, a throughput of an entire production line is seriously affects. Therefore, it is necessary to develop a fast and accurate gamma curve verification method in production of a high-quality liquid crystal panel.

SUMMARY

To resolve the foregoing technical problem, an objective of this application is to provide a method for detecting a display panel, and in particular, a measurement method for measuring a display panel and an apparatus thereof, so as to fast measure and verify a gamma curve.

The objective of this application is achieved and the technical problem of this application is resolved by using the following technical solutions. A measurement method for measuring a display panel proposed according to this application comprises: correcting a measurement picture of a display panel; obtaining, by using a measurement apparatus, a picture to be measured; setting a shooting instrument to complete a shooting parameter under a measurement environment; shooting and correcting system measurement data by using the shooting parameter; replacing a display panel to be measured; measuring a gamma curve; and outputting a gamma curve, where the display panel needs to be corrected only once, and a gamma curve of a next display panel continues to be measured.

The objective of this application may further be achieved and the technical problem of this application may further be resolved by using the following technical measures.

Another objective of this application is a measurement method for measuring a display panel, comprising: correcting a measurement picture of a display panel; obtaining, by using a measurement apparatus, a picture to be measured; setting a shooting instrument to complete a shooting parameter under a measurement environment; shooting and correcting system measurement data by using the shooting parameter; replacing a display panel to be measured; measuring a gamma curve; and outputting a gamma curve, where the display panel needs to be corrected only once, and a gamma curve of a next display panel continues to be measured; an interpolation operation is performed on gray-scale values on the isoluminance spatial planes, to obtain brightness distribution of entire brightness space; the interpolation operation is a linear interpolation operation or a non-linear interpolation operation; the interpolation operation comprises: collecting brightness information of points on an isoluminance spatial plane, under each (x,y) coordinate, obtaining brightness distribution L(x,y) at the position, and defining N different (x,y) position coordinates represent different brightness images, and obtaining, by using an interpolation method from brightness messages shot under different (x,y) coordinates, corresponding brightness by means of an interpolation operation, and consequently, obtaining brightness under N different gray-scales in gamma curve distribution, N being a positive number; and the measurement apparatus may be a photosensitive coupling component or a complementary metal-oxide semiconductor.

Still another objective of this application is a measurement apparatus for measuring a display panel, comprising: a display panel; a measurement picture unit, electrically connected to the display panel and configured to correct a measurement picture of a display panel; a picture capturing unit, electrically connected to the display panel and configured to obtain a picture to be measured; a shooting instrument unit, electrically connected to the display panel and configured to complete a shooting parameter under a measurement environment and shoot and correct system measurement data by using the shooting parameter; and a gamma curve measurement unit, electrically connected to the display panel and configured to output a gamma curve, where the display panel needs to be corrected only once, and a gamma curve of a next display panel continues to be measured.

In an embodiment of this application, the measurement apparatus is a photoelectric conversion component; the step of obtaining, by using a measurement apparatus, a picture to be measured comprises: converting information of each unit pixel of the panel and obtaining an image having brightness space distribution.

In an embodiment of this application, the step of setting a shooting instrument to complete a shooting parameter under a measurement environment comprises: setting an aperture and a shutter time corresponding to the shooting instrument, where the measurement apparatus can detect a brightness reaction when a high-brightness picture has saturated brightness and in a case of a low-gray-scale picture.

In an embodiment of this application, the step of shooting and correcting system measurement data by using the shooting parameter comprises: after converting each of the edited images into an image having brightness space distribution, correcting spatial brightness; and creating coordinates for planar space and defining isoluminance spatial planes.

In an embodiment of this application, color gray-scale values on the isoluminance spatial plane comprise: a chrominance and brightness message of a first color panel unit pixel, a chrominance and brightness message of a second color panel unit pixel, a chrominance and brightness message of a third color panel unit pixel, a chrominance and brightness message of a fourth color panel unit pixel, and a chrominance and brightness message of a fifth color panel unit pixel and are used to edit and configure a measurement picture needed by measurement of the measurement apparatus.

In an embodiment of this application, an interpolation operation is performed on gray-scale values on the isoluminance spatial planes, to obtain brightness distribution of entire brightness space; the interpolation operation is a linear interpolation operation or a non-linear interpolation operation.

In an embodiment of this application, brightness distribution of the brightness space is gamma curve distribution.

In an embodiment of this application, the interpolation operation comprises: collecting brightness information of points on an isoluminance spatial plane, under each (x,y) coordinate, obtaining brightness distribution L(x,y) at the position, and defining N different (x,y) position coordinates represent different brightness images; and obtaining, by using an interpolation method from brightness messages shot under different (x,y) coordinates, corresponding brightness by means of an interpolation operation, and consequently, obtaining brightness under N different gray-scales in gamma curve distribution, N being a positive number.

In this application, a gamma curve can be fast measured and verified, thereby improving competitiveness of a product.

DETAILED DESCRIPTION

The following embodiments are described with reference to the accompanying drawings, and are used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, modules with similar structures are represented by using the same reference number. In addition, for understanding and ease of description, a size and a thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a base is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located above or below a target component and does not mean that the component needs to be located on the top based on a gravity direction.

To further describe the technical means used in this application to achieve the application objective and effects thereof, specific implementations, structures, features, and effects of a measurement method for measuring a display panel and an apparatus thereof provided according to this application are described in detail below with reference to the drawings and preferred embodiments.

A display panel of this application may include an LCD panel, an organic light-emitting diode (OLED) panel, a quantum dots light-emitting diode (QLED) panel, or other display panels. Using the LCD panel as an example, the LCD panel may include: a switch array ((thin film transistor, TFT) substrate, a color filter (CF) substrate, and a liquid crystal layer formed between two substrates. The active array (TFT) and the CF may be formed on a same substrate.

In an embodiment, the display panel in this application may be a curved-surface display panel.

Figure 1:
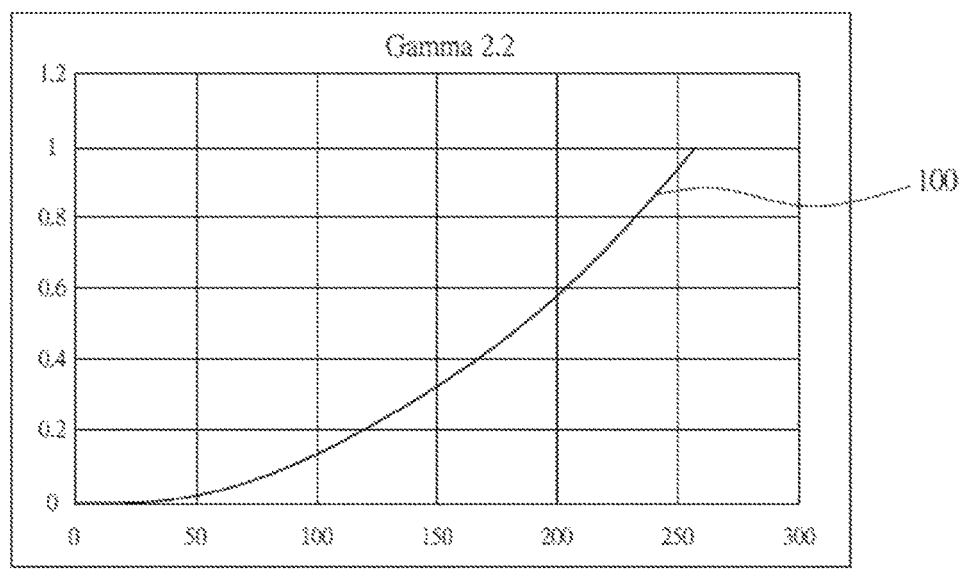
FIG. 1 is a schematic diagram of an exemplary gamma curve.
Figure 2:
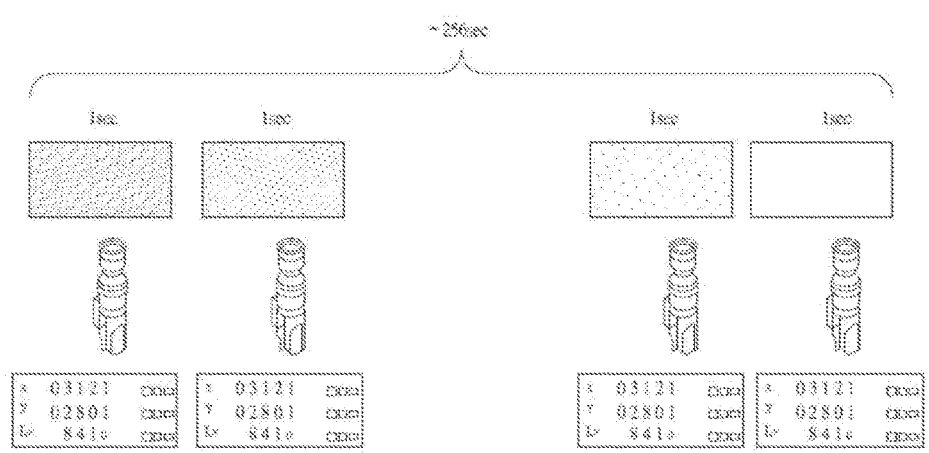
FIG. 2 is a schematic diagram of an exemplary gamma curve instrument for measuring a display panel.

FIG. 1 is a schematic diagram of an exemplary gamma curve, and FIG. 2 is a schematic diagram of an exemplary gamma curve instrument for measuring a display panel. Referring to FIG. 1, a gamma curve 100 has a compensation-display system capable of obtaining optimal display effects.

Referring to FIG. 2, a gamma curve instrument 200 for measuring a display panel needs to progressively measure a gamma curve on a display. It takes approximately 256 seconds to measure a group of 8-bit gamma curves.

Figure 3:
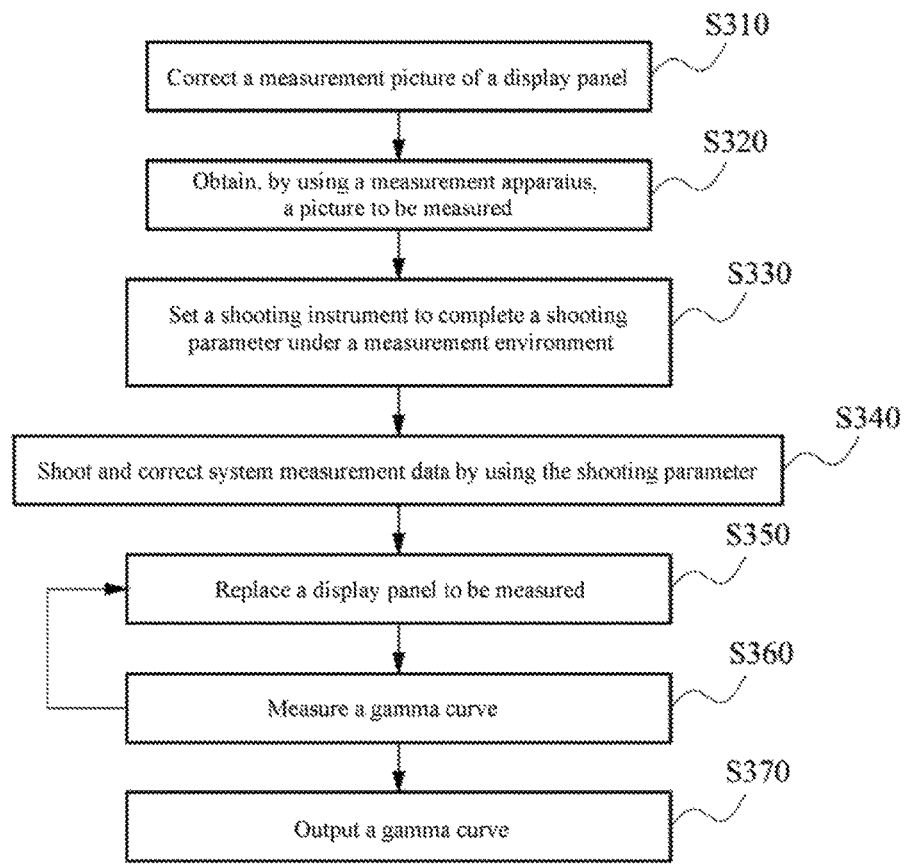
FIG. 3 is a flowchart of a measurement method for measuring a display panel according to an embodiment of this application.
Figure 4:
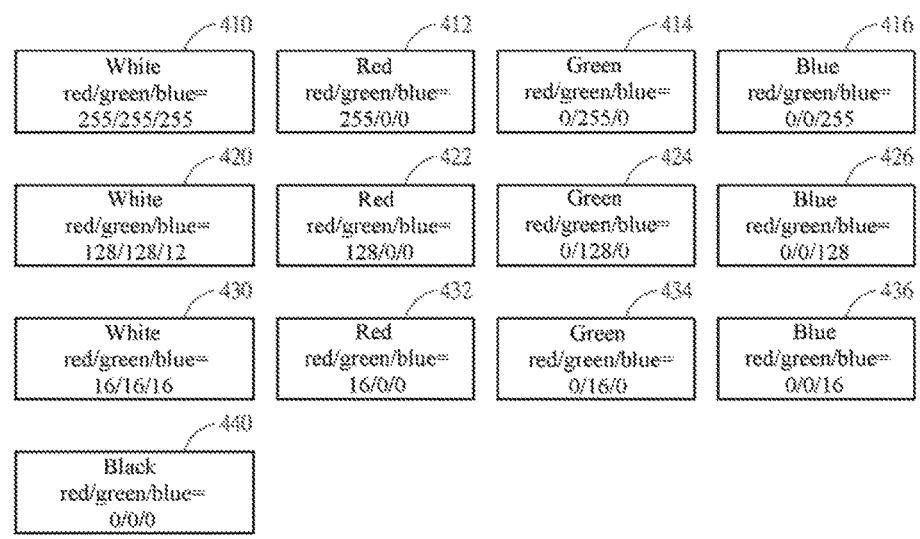
FIG. 4 is a schematic diagram of a picture measured by using a photoelectric conversion component according to an embodiment of this application.
Figure 5A:
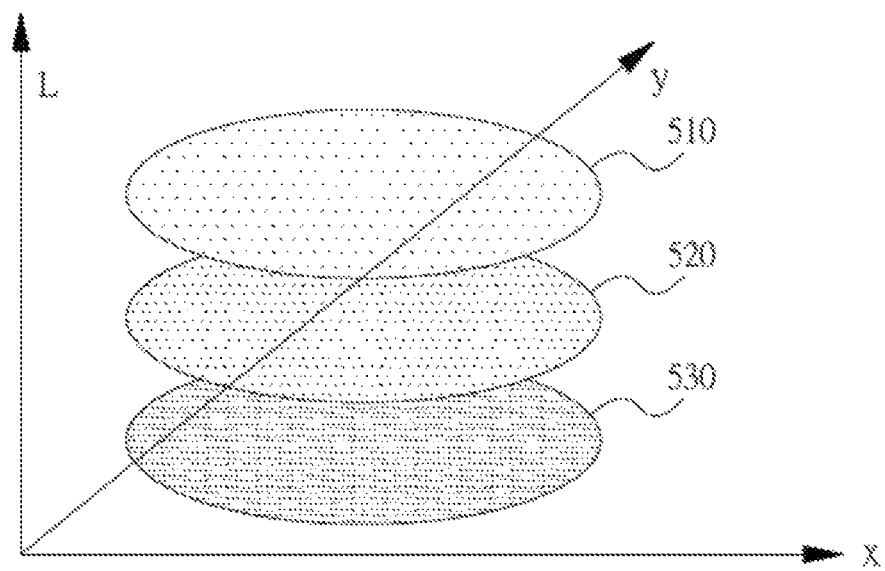
FIG. 5a is a schematic diagram of a coordinate of an isoluminance spatial plane according to an embodiment of this application.
Figure 5B:
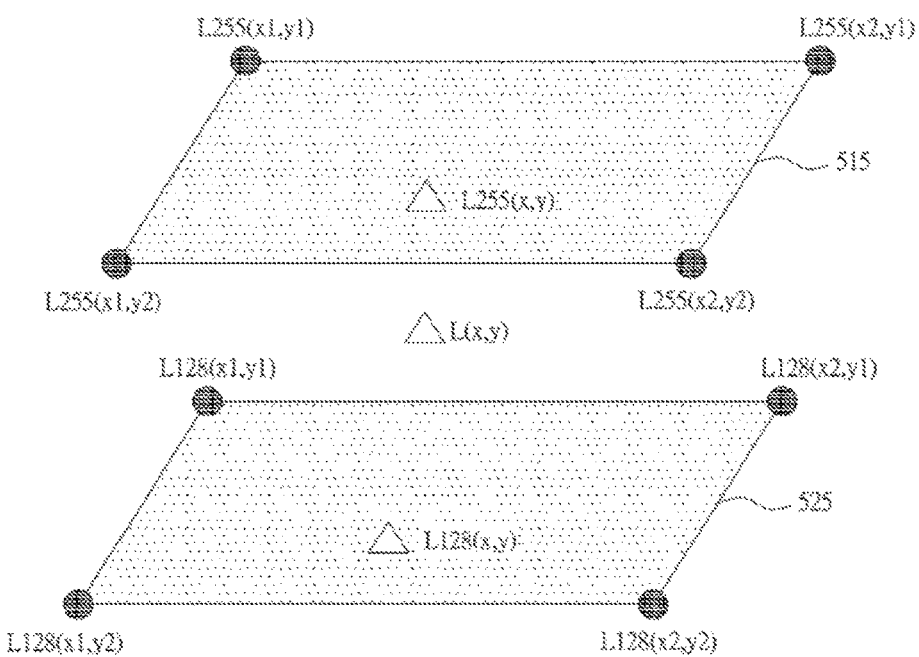
FIG. 5b is a schematic diagram of a coordinate of an isoluminance spatial plane according to another embodiment of this application.
Figure 6:
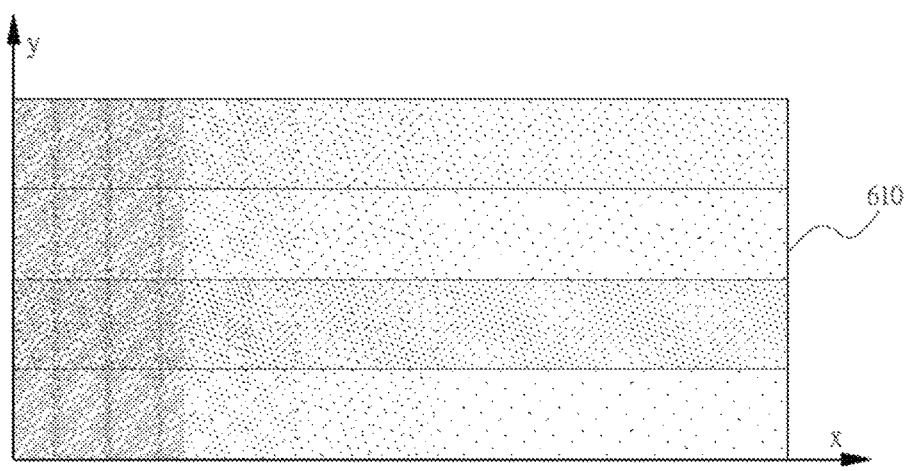
FIG. 6 is a schematic diagram of distribution of a gamma curve having 256 different gray-scale values.

FIG. 3 is a flowchart of a measurement method for measuring a display panel according to an embodiment of this application; FIG. 4 is a schematic diagram of a picture measured by using a photoelectric conversion component according to an embodiment of this application; FIG. 5a is a schematic diagram of a coordinate of an isoluminance spatial plane according to an embodiment of this application; FIG. 5b is a schematic diagram of a coordinate of an isoluminance spatial plane according to another embodiment of this application; and FIG. 6 is a schematic diagram of distribution of a gamma curve having 256 different gray-scale values. Referring to FIG. 3, in an embodiment of this application, a measurement method for measuring a display panel includes: correcting a measurement picture of a display panel; obtaining, by using a measurement apparatus, a picture to be measured; setting a shooting instrument to complete a shooting parameter under a measurement environment; shooting and correcting system measurement data by using the shooting parameter; replacing a display panel to be measured; measuring a gamma curve; and outputting a gamma curve, where the display panel needs to be corrected only once, and a gamma curve of a next display panel continues to be measured.

Referring to FIG. 3, process S310: Correct a measurement picture of a display panel.

Referring to FIG. 3, process S320: Obtain, by using a measurement apparatus, a picture to be measured.

Referring to FIG. 3, process S330: Set a shooting instrument to complete a shooting parameter under a measurement environment.

Referring to FIG. 3, in process S340: Shoot and correct system measurement data by using the shooting parameter.

Referring to FIG. 3, in process S350: Replace a display panel to be measured.

Referring to FIG. 3, in process S360: Measure a gamma curve.

Referring to FIG. 3, in process S370: Output a gamma curve.

In an embodiment, the measurement apparatus is a photoelectric conversion component.

In an embodiment, the step of obtaining, by using a measurement apparatus, a picture to be measured includes: converting information of each unit pixel of the panel and obtaining an image having brightness space distribution.

In an embodiment, the step of setting a shooting instrument to complete a shooting parameter under a measurement environment comprises: setting an aperture and a shutter time corresponding to the shooting instrument, where the measurement apparatus can detect a brightness reaction when a high-brightness picture has saturated brightness and in a case of a low-gray-scale picture.

Referring to FIG. 5a and FIG. 5b, in an embodiment, the step of shooting and correcting system measurement data by using the shooting parameter includes: after converting each of the edited images into an image having brightness space distribution, correcting spatial brightness; and creating coordinates 515 and 525 for planar space and defining isoluminance spatial planes (255 brightness distribution spatial planes) 510, (128 brightness distribution spatial planes) 520, and (16 brightness distribution spatial planes) 530.

Referring to FIG. 4, in an embodiment, color gray-scale values on the isoluminance spatial plane include: a chrominance and brightness message of a first color (white) 410 (red/green/blue=255/255/255), 420 (red/green/blue=128/128/128), 430 (red/green/blue=16/16/16) panel unit pixel, a chrominance and brightness message of a second color (red) 412 (red/green/blue=255/0/0), 422 (red/green/blue=128/0/0), 432 (red/green/blue=16/0/0) panel unit pixel, a chrominance and brightness message of a third color (green) 414 (red/green/blue=0/255/0), 424 (red/green/blue=0/128/0), 434 (red/green/blue=0/16/0) panel unit pixel, a chrominance and brightness message of fourth color (blue) 416 (red/green/blue=0/0/255), 426 (red/green/blue=0/0/128), 436 (red/green/blue=0/0/16) panel unit pixel, and a chrominance and brightness message of a fifth color (black) 440 (red/green/blue=0/0/0) panel unit pixel and are used to edit and configure a measurement picture needed by measurement of the measurement apparatus.

Referring to FIG. 5b, in an embodiment, an interpolation operation is performed on gray-scale values on the isoluminance spatial planes 515 and 525, to obtain brightness distribution of entire brightness space.

Referring to FIG. 6, in an embodiment, brightness distribution of the brightness space is gamma curve distribution.

In an embodiment, the interpolation operation is a linear interpolation operation or a non-linear interpolation operation.

In an embodiment, a brightness detector is further included, and is configured to detect color luminous intensity of the display panel.

Referring to FIG. 3, in an embodiment, a measurement method for measuring a display panel may be accelerated by approximately 256 times for an 8-bit output panel, greatly improving a production throughput.

Referring to FIG. 3, in an embodiment, a measurement method for measuring a display panel may be accelerated by approximately 1024 times for a 10-bit output panel, greatly improving a production throughput.

Referring to FIG. 5a, FIG. 5b, and FIG. 6, in an embodiment of this application, a numerical method using an interpolation method includes: collecting brightness information of points on an isoluminance spatial plane, under each (x,y) coordinate, obtaining brightness distribution L(x, y) at the position, and defining N different (x,y) position coordinates represent different brightness images; and obtaining, by using an interpolation method from brightness messages shot under different (x,y) coordinates, corresponding brightness by means of an interpolation operation, and consequently, obtaining brightness under N different gray-scales in gamma curve distribution, N being a positive number.

Referring to FIG. 5a, FIG. 5b, and FIG. 6, in an embodiment, brightness information of points on the plane is calculated by using an interpolation operation, that is, under each (x,y) coordinate, brightness distribution L(x,y) at the position can be known. Therefore, it can be defined that 256 different (x,y) position coordinates represent different brightness images 610, as shown in FIG. 6. Then corresponding brightness is obtained, by using an interpolation method from brightness messages shot under different (x,y)

coordinates, by means of an interpolation operation. Consequently, brightness under 256 different gray-scales is obtained, that is, is in gamma curve distribution.

Referring to FIG. 3, in an embodiment, in a measurement method for measuring a display panel, 10-bit and 1024-gray-scale gamma curve information or a gamma curve of different RGB colors may be obtained.

In an embodiment of this application, a method for detecting a process of a display device includes a numerical value applying an interpolation method, and further includes the measurement method for measuring a display panel.

Figure 7:
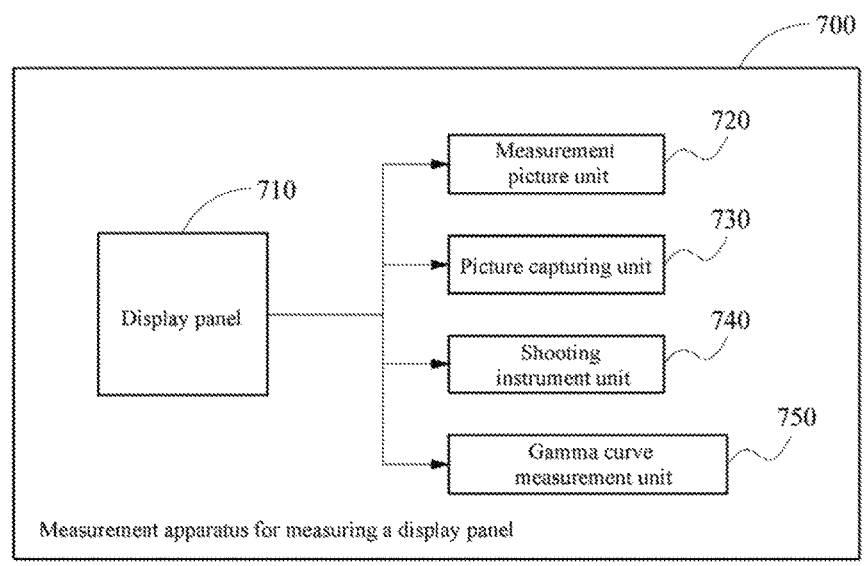
FIG. 7 is a block diagram of an apparatus for measuring a display panel according to an embodiment of this application.

FIG. 7 is a block diagram of an apparatus for measuring a display panel according to an embodiment of this application. In an embodiment of this application, a measurement apparatus 700 for measuring a display panel, including: a display panel 710; a measurement picture unit 720, electrically connected to the display panel 710 and configured to correct a measurement picture of a display panel 710; a picture capturing unit 730, electrically connected to the display panel 720 and configured to obtain a picture to be measured; a shooting instrument unit 740, electrically connected to the display panel 710 and configured to complete a shooting parameter under a measurement environment and shoot and correct system measurement data by using the shooting parameter; and a gamma curve measurement unit 750, electrically connected to the display panel 710 and configured to output a gamma curve, where the display panel 710 needs to be corrected only once, and a gamma curve of a next display panel continues to be measured.

In this application, a gamma curve can be fast measured and verified, thereby improving competitiveness of a product.

Phrases such as "in some embodiments" and "in various embodiments" are repeatedly used. The phrases usually refer to different embodiments, but they may also refer to a same embodiment. Words such as "comprise", "have", and "include" are synonyms, unless other meanings are indicated in the context.

The foregoing descriptions are merely specific embodiments of this application, and are not intended to limit this application in any form. Although this application has been disclosed above by using specific embodiments, the embodiments are not intended to limit this application. Any person skilled in the art can make some variations or modifications, namely, equivalent changes, according to the foregoing disclosed technical content to obtain equivalent embodiments without departing from the scope of the technical solutions of this application. Any simple amendment, equivalent change, or modification made to the foregoing embodiments according to the technical essence of this application without departing from the content of the technical solutions of this application shall fall within the scope of the technical solutions of this application.

What is claimed is:

1. A measurement method for measuring a display panel, comprising:
   correcting a measurement picture of a display panel;
   obtaining, by using a measurement apparatus, a picture to be measured;
   setting a shooting instrument to complete a shooting parameter under a measurement environment;
   shooting and correcting system measurement data by using the shooting parameter;
   replacing a display panel to be measured;
   measuring a gamma curve; and
   outputting a gamma curve, wherein the display panel needs to be corrected only once, and a gamma curve of a next display panel continues to be measured;
   wherein the step of shooting and correcting system measurement data by using the shooting parameter comprises: after converting each of the edited images into an image having brightness space distribution, correcting spatial brightness,
   wherein the step of shooting and correcting system measurement data by using the shooting parameter comprises: creating coordinates for planar space and defining isoluminance spatial planes,
   wherein an interpolation operation is performed on gray-scale values on the isoluminance spatial planes, to obtain brightness distribution of entire brightness space,
   wherein the interpolation operation comprises:
      collecting brightness information of points on an isoluminance spatial plane, under each (x,y) coordinate, obtaining brightness distribution L(x,y) at the position, and defining N different (x,y) position coordinates represent different brightness images.

2. The measurement method for measuring a display panel according to claim 1, wherein the measurement apparatus is a photoelectric conversion component.

3. The measurement method for measuring a display panel according to claim 1, wherein the step of obtaining, by using a measurement apparatus, a picture to be measured comprises: converting information of each unit pixel of the display panel and obtaining an image having brightness space distribution.

4. The measurement method for measuring a display panel according to claim 1, wherein the step of setting a shooting instrument to complete a shooting parameter under a measurement environment comprises: setting an aperture and a shutter time corresponding to the shooting instrument, wherein the measurement apparatus can detect a brightness reaction when a high-brightness picture has saturated brightness and in a case of a low-gray-scale picture.

5. The measurement method for measuring a display panel according to claim 1, wherein color gray-scale values on the isoluminance spatial plane comprise: a chrominance and brightness message of a first color panel unit pixel, a chrominance and brightness message of a second color panel unit pixel, a chrominance and brightness message of a third color panel unit pixel, a chrominance and brightness message of a fourth color panel unit pixel, and a chrominance and brightness message of a fifth color panel unit pixel and are used to edit and configure a measurement picture needed by measurement of the measurement apparatus.

6. The measurement method for measuring a display panel according to claim 1, wherein the interpolation operation is a linear interpolation operation.

7. The measurement method for measuring a display panel according to claim 1, wherein the interpolation operation is a non-linear interpolation operation.

8. The measurement method for measuring a display panel according to claim 1, wherein brightness distribution of the brightness space is gamma curve distribution.

9. The measurement method for measuring a display panel according to claim 1, further comprising: obtaining, by using an interpolation method from brightness messages shot under different (x,y) coordinates, corresponding brightness by means of an interpolation operation, and consequently, obtaining brightness under N different gray-scales in gamma curve distribution, N being a positive number.

10. The measurement method for measuring a display panel according to claim 1, wherein the measurement apparatus is a photosensitive coupling component.

11. The measurement method for measuring a display panel according to claim 1, wherein the measurement apparatus is a complementary metal-oxide semiconductor.

12. The measurement method for measuring a display panel according to claim 1, further comprising a brightness detector, configured to detect color luminous intensity of the display panel.

13. The measurement method for measuring a display panel according to claim 12, wherein the brightness detector is configured to detect color luminous intensity of the display panel.

14. A measurement method for measuring a display panel, comprising:
correcting a measurement picture of a display panel;
obtaining, by using a measurement apparatus, a picture to be measured;
setting a shooting instrument to complete a shooting parameter under a measurement environment;
shooting and correcting system measurement data by using the shooting parameter;
replacing a display panel to be measured;
measuring a gamma curve; and
outputting a gamma curve, wherein
the display panel needs to be corrected only once, and a gamma curve of a next display panel continues to be measured; an interpolation operation is performed on gray-scale values on the isoluminance spatial planes, to obtain brightness distribution of entire brightness space; the interpolation operation is a linear interpolation operation or a non-linear interpolation operation; the interpolation operation comprises: collecting brightness information of points on an isoluminance spatial plane, under each (x,y) coordinate, obtaining brightness distribution L(x,y) at the position, and defining N different (x,y) position coordinates represent different brightness images, and obtaining, by using an interpolation method from brightness messages shot under different (x,y) coordinates, corresponding brightness by means of an interpolation operation, and consequently, obtaining brightness under N different gray-scales in gamma curve distribution, N being a positive number; and the measurement apparatus is a photosensitive coupling component or a complementary metal-oxide semiconductors;

wherein the step of shooting and correcting system measurement data by using the shooting parameter comprises: after converting each of the edited images into an image having brightness space distribution, correcting spatial brightness, wherein the step of shooting and correcting system measurement data by using the shooting parameter comprises: creating coordinates for planar space and defining isoluminance spatial planes.

15. A measurement apparatus for measuring a display panel, comprising:
a display panel;
a measurement picture unit, electrically connected to the display panel and configured to correct a measurement picture of a display panel;
a picture capturing unit, electrically connected to the display panel and configured to obtain a picture to be measured;
a shooting instrument unit, electrically connected to the display panel and configured to complete a shooting parameter under a measurement environment and shoot and correct system measurement data by using the shooting parameter, after converting each of the edited images into an image having brightness space distribution, correcting spatial brightness, and creating coordinates for planar space and defining isoluminance spatial planes; and
a gamma curve measurement unit, electrically connected to the display panel and configured to output a gamma curve, wherein
the display panel needs to be corrected only once, and a gamma curve of a next display panel continues to be measured,
wherein an interpolation operation is performed on gray-scale values on the isoluminance spatial planes, to obtain brightness distribution of entire brightness space by the gamma curve measurement unit,
wherein the interpolation operation comprises:
collecting brightness information of points on an isoluminance spatial plane, under each (x,y) coordinate, obtaining brightness distribution L(x,y) at the position, and defining N different (x,y) position coordinates represent different brightness images.

16. The measurement apparatus for measuring a display panel according to claim 15, further comprising a brightness detector, configured to detect color luminous intensity of the display panel.

* * * * *